Feb. 6, 1934.  H. F. PARKER  1,946,032
BRAKE
Filed Nov. 24, 1930   3 Sheets-Sheet 1

INVENTOR.
HUMPHREY F. PARKER
BY
M. W. McConkey
ATTORNEY

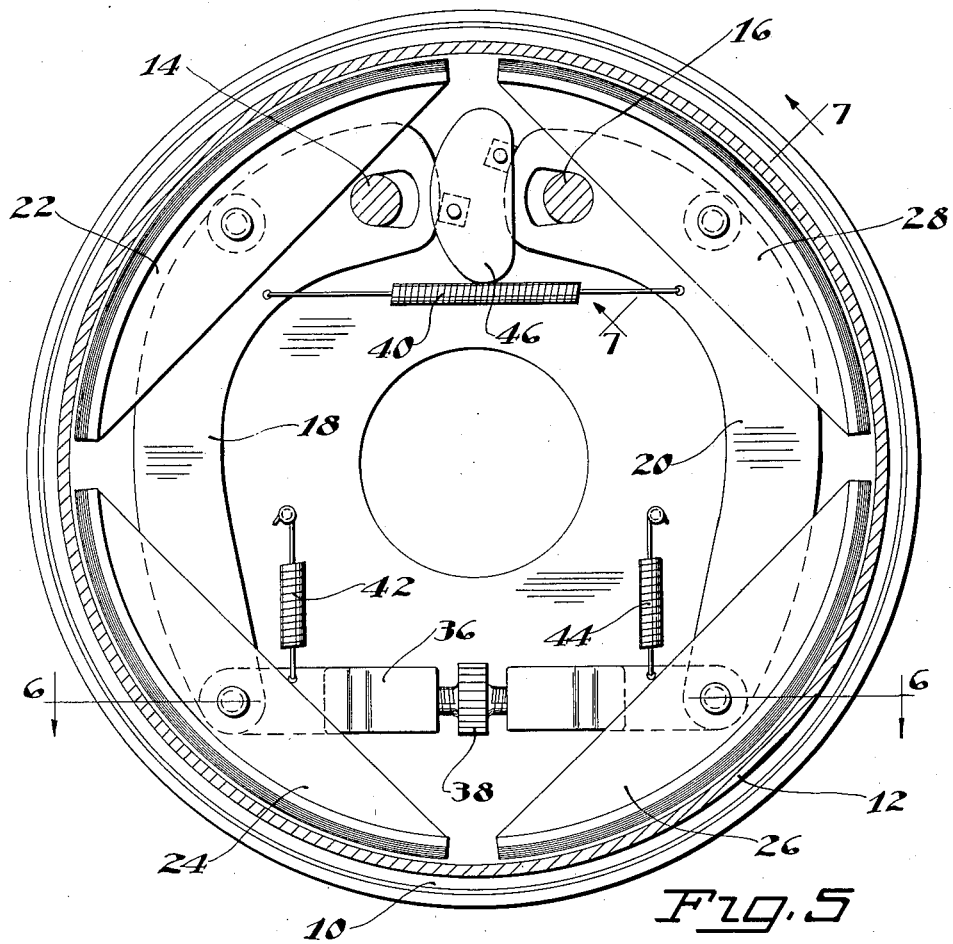
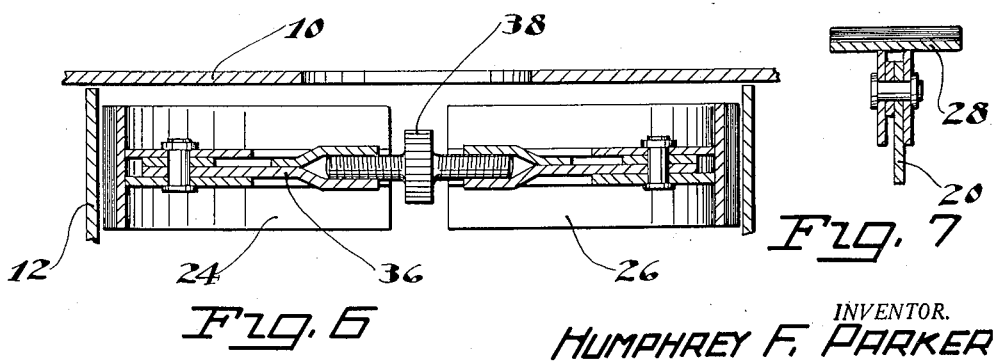

Feb. 6, 1934.   H. F. PARKER   1,946,032
BRAKE
Filed Nov. 24, 1930    3 Sheets-Sheet 3

INVENTOR.
HUMPHREY F. PARKER
BY
M. W. McConkey
ATTORNEY

Patented Feb. 6, 1934

1,946,032

UNITED STATES PATENT OFFICE 1,946,032

BRAKE

Humphrey F. Parker, South Bend, Ind., assignor to Bendix Brake Company, South Bend, Ind., a corporation of Illinois Application November 24, 1930
Serial No. 497,651

17 Claims. (Cl. 188—78)

This invention relates to brakes and more particularly to internal expanding brakes.

An object of the invention is to provide means for effectively applying friction elements to a rotatable drum.

Another object of the invention is to provide means for moving the friction elements of a brake into engagement with the braking surface of the drum with a uniform distribution of the applied force.

A feature of the invention is a brake structure having a plurality of friction elements or shoes so connected by levers that upon actuation the primary shoe is given a slight circumferential movement due to the whipping or wiping action of the drum. This circumferential movement applies force through suitable linkage to the secondary shoe causing this element to engage the drum, and since the secondary shoe is connected to a second secondary shoe by an adjustable member, the second secondary shoe is caused to engage the drum, making three shoes in effective engagement with the drum. The adjustable member is shown connected to a lever member which engages an anchor, and this member may carry a fourth or auxiliary shoe which serves as a primary shoe when the drum is turning in the reverse direction, in which case the anchorage is preferably through the lever or link connecting the shoes which are referred to above as the primary and secondary shoes.

Another feature of the invention is four interchangeable friction elements or shoes arranged in pairs, and connected by links or levers pivoted on the backing plate, each pair of friction elements being connected by a toggle operated through a cable and an adjusting member for determining the relative position of the shoes to the braking surface of the drum which also serves to convey force from the secondary shoe to the second secondary shoe.

Other objects and features of the invention will appear from the following description taken in connection with the drawings, which form a part of this specification, and in which:

Figure 5 is a similar view to Figure 1 illustrating a modification;

Figure 6 is a sectional view, substantially on line 6—6 of Figure 5;

Figure 7 is a sectional view, substantially on line 7—7 of Figure 6;

Figure 1:
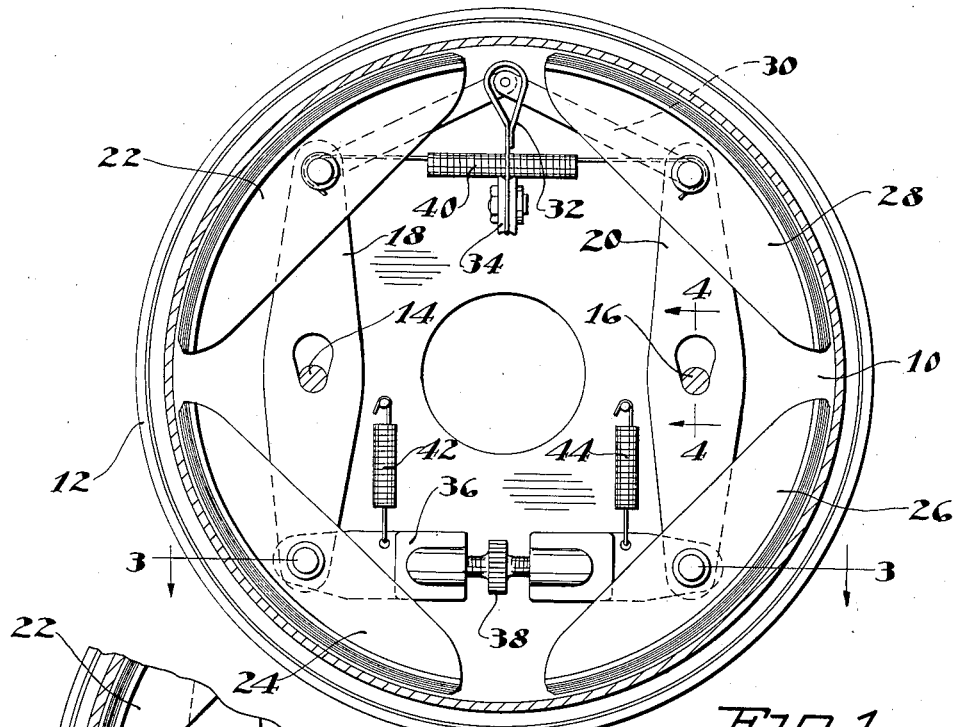
Figure 1 is a vertical sectional view taken just back of the head of the drum illustrating the friction elements and the operating means in elevation.

Referring to the drawings for more specific details of the invention, 10 represents a fixed support such as a backing plate. Associated with the backing plate is a rotatable drum 12 which may be secured to a wheel, not shown. Positioned on the backing plate are two fixed anchors 14 and 16 and fulcrumed on these anchors are corresponding levers 18 and 20. As shown, the levers 18 and 20 are susceptible of shifting on their anchors, the object of which will be hereinafter explained.

Pivoted to the respective ends of the levers 18 and 20 are friction elements 22, 24, 26 and 28. The pivot connecting the lever 18 to the friction element 22 and the pivot connecting the lever 20 to the friction element 28 are connected by a toggle 30, the knee of which is connected to an operating cable 32 passing over a roller 34 to any suitable source of power, not shown. The pivot connecting the lever 18 to the friction element 24 and the pivot connecting the lever 20 to the friction element 26 are connected by a suitable adjusting member 36. As shown, the adjusting member comprises a divided link connected by a screw 38.

Connecting the friction elements 22 and 28 is a coil spring 40 and connecting the divided link or adjusting member 36 to suitable fixed supports on the backing plate are coil springs 42 and 44. These springs serve to return and retain the friction elements in proper spaced relation with relation to the drum when the applied force is released.

Figure 2:
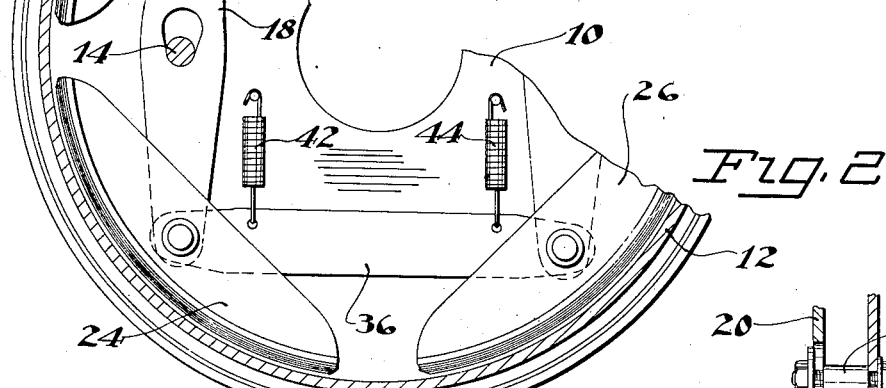
Figure 2 is a fragmentary view illustrating a modified form of the invention.
Figure 4:
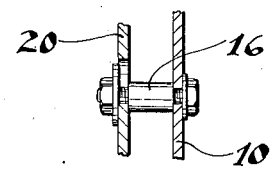
Figure 4 is a sectional view, substantially on line 4—4 of Figure 1.
Figure 3:
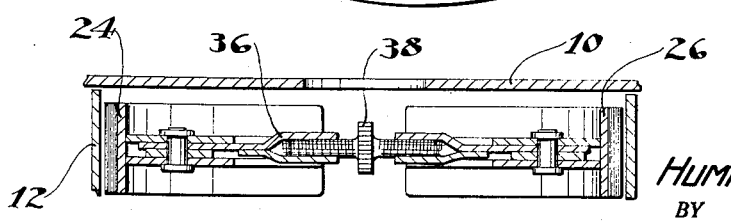
Figure 3 is a sectional view, substantially on line 3—3 of Figure 1.

A modified form of the invention is illustrated in Figure 2, wherein the link 36 is made rigid and non-adjustable in order to simplify the structure.

Another modification of the invention is illustrated in Figures 5, 6 and 7. In this modification, the anchors 14 and 16 are positioned relatively near the separable ends of the levers 18 and 20 and positioned between the levers is an actuating cam 46 which may be of any preferred form. Practically the only difference between this modification and the preferred embodiment of the invention is to be found in the levers 18 and 20 and the operating means. As shown, the levers are curved to support the shoes in proper spaced relation to the drum and the separable ends are provided with openings for the reception of the anchors and curved surfaces adaptable for engagement with the operating cam.

Figure 8:
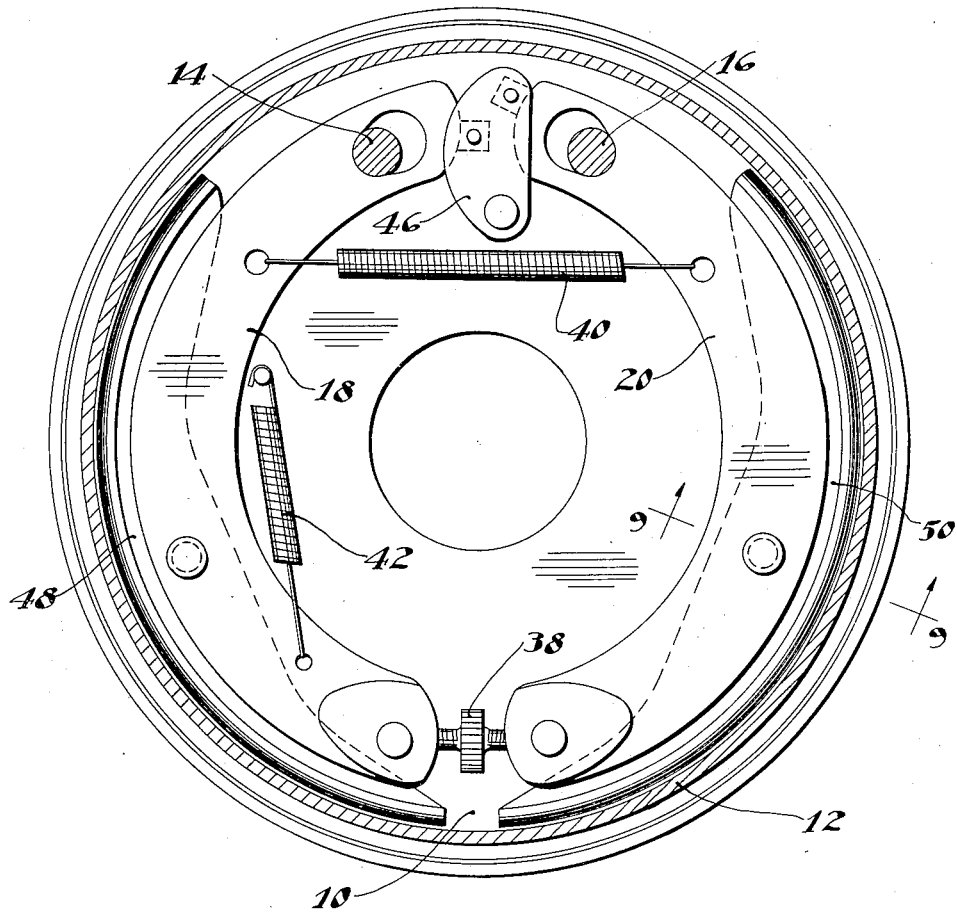
Figure 8 is a similar view to Figure 1 illustrating a further modification.
Figure 9:
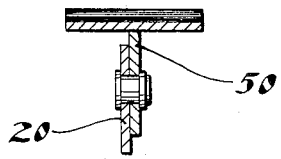
Figure 9 is a sectional view substantially on line 9—9 of Figure 8.

A further modification is shown in Figures 8 and 9 wherein only two shoes 48 and 50 are provided. This modification differs from the modification illustrated in Figures 5, 6 and 7 in that the levers are substantially semi-circular and are connected at their articulated ends by a short adjusting member pivotally secured to the levers.

In operation, the toggle 30 is actuated to move the friction elements or shoes 22 and 28 into engagement with the drum. Upon the initial engagement of the shoe 22 with the drum, this element is given, due to the whipping action of the drum, a slight circumferential movement. This movement is conveyed through the lever 18 to the friction element 24. This is made possible by the shifting of the lever 18 on its fulcrum or anchor 14.

Upon engagement of the friction element 24 with the braking surface of the drum, a slight centrifugal movement thereof applies force to the friction element 26 through the link 36. This element is anchored by the lever 20 to the anchor 16. The friction element 28 is applied only through the toggle 30. It is, of course, to be understood that on reverse braking the operation of the friction elements is exactly the reverse of that given.

Although this invention has been described in connection with certain specific embodiments, the principles involved are susceptible of numerous other applications that will readily occur to persons skilled in the art. The invention is, therefore, to be limited only as indicated by the scope of the appended claims. The present application is however, junior to Andres application 199,969, owned by my assignee Bendix Brake Company, and it is not my intention to claim herein any of the subject-matter of the said Andres application.

I claim:

1. A brake comprising two levers, shoes pivoted to the levers, an adjusting member pivoted between the levers and an operating member between the levers, together with anchorage means acting on the levers and taking the torque of said shoes.

2. A brake comprising two corresponding levers, brake shoes pivoted on each of the levers, an adjustable member connecting the levers and an operating member connecting the levers, together with anchorage means acting on the levers and taking the torque of said shoes.

3. A brake comprising a fixed support, two corresponding levers slidably anchored on the support, shoes pivoted on the levers, an adjustable link pivotally connecting the levers and an operating member between the levers.

4. A brake comprising two parallel levers, shoes pivoted to the levers, an adjusting member pivoted between the levers, an anchor engaged by each lever, one or the other of which anchors takes the torque of said shoes when the brake is applied, and an operating member connected between the levers.

5. A brake comprising two substantially parallel levers, a pair of brake shoes independently pivoted on each lever, an adjustable member connecting the levers and an operating member connecting the levers.

6. A brake comprising a fixed support, two substantially parallel levers slidable on the support, shoes pivoted on the respective ends of the levers, a link connecting the levers and an operating member between the levers.

7. A brake comprising a fixed support, slidable levers anchored thereon, a link connecting the levers, a toggle connecting the levers and shoes pivoted upon the respective ends of the levers.

8. A brake comprising a fixed support, two corresponding levers arranged in spaced parallel relation, an adjusting member connecting the lower ends of the levers, a toggle connecting the upper end of the levers, a force applying means connected to the knee of the toggle and corresponding shoes pivotally connected to the respective ends of the levers.

9. A brake comprising a fixed support, a rotatable drum associated therewith, spaced parallel levers slidable on the support, an adjustable member connected between the lower ends of the levers, a toggle connected between the upper ends of the levers, an operating cable connected to the knee of the toggle and shoes pivoted on the respective ends of the levers adaptable for co-operation with the drum.

10. A brake comprising a fixed support a rotatable drum associated therewith, corresponding parallel levers shiftable on the support, an adjusting member connected between the lower ends of the lever, a toggle connected between the upper ends of the levers, an operating cable connected to the knee of the toggle, a return spring connected between the upper ends of the lever, return springs connecting the adjusting member to the support and corresponding shoes pivoted to the respective ends of the levers for co-operation with the drum.

11. A brake comprising a fixed support, a rotatable drum associated therewith, corresponding levers slidably anchored on the support, an operating member between the upper ends of the levers, an adjusting member connecting the lower ends of the levers and brake shoes pivoted to the levers adaptable for co-operation with the drum.

12. A brake comprising a fixed support, corresponding levers movable on the support, an adjusting member pivotally connected to the articulated ends of the levers, anchors for the separable ends of the levers, an operating member between the separable ends of the levers, shoes pivoted on the articulated ends of the levers, shoes pivoted on the levers adjacent the anchors and a drum adapted for co-operation with the shoes.

13. A brake comprising, in combination, a drum, a series of shoes engageable with the drum and at least three of which are effective in either direction of drum rotation, and a linkage connecting the shoes and which has one anchorage when the drum is turning in one direction and a different anchorage when the drum is turning in the other direction.

14. A brake comprising, in combination, a drum, a series of shoes engageable with the drum and at least three of which are effective in either direction of drum rotation, and a linkage connecting and carrying the shoes and which has one anchorage when the drum is turning in one direction and a different anchorage when the drum is turning in the other direction, there being at least four shoes in all, with one shoe idle when the drum is turning in one direction and a different shoe idle when the drum is turning in the other direction.

15. A brake comprising a drum, a pair of levers, each having a shoe mounted thereon, a pair of anchorages engaging the ends of the levers and one of which takes the torque of the brake when the drum is turning in one direction and the other of which takes the torque when the drum is turning in the other direction, and floating means connecting the unanchored ends of the levers.

16. A brake comprising a drum, a pair of levers, each having a shoe mounted thereon, a pair of anchorages engaging the ends of the levers and one of which takes the torque of the brake when the drum is turning in one direction and the other of which takes the torque when the drum is turning in the other direction, and floating means connecting the unanchored ends of the levers, said shoes being connected to the levers by pivots nearer the connected ends than the anchored ends of the levers.

17. A brake comprising a drum, a pair of connected levers so arranged that one lever anchors when the drum is turning in one direction and the other lever anchors when the drum is turning in the other direction, and shoes connected to said levers respectively at a substantial distance from the centers of the levers.

HUMPHREY F. PARKER.